Sept. 10, 1940.  A. J. LIPPOLD  2,214,252
LUBRICATING SYSTEM
Original Filed Feb. 23, 1935
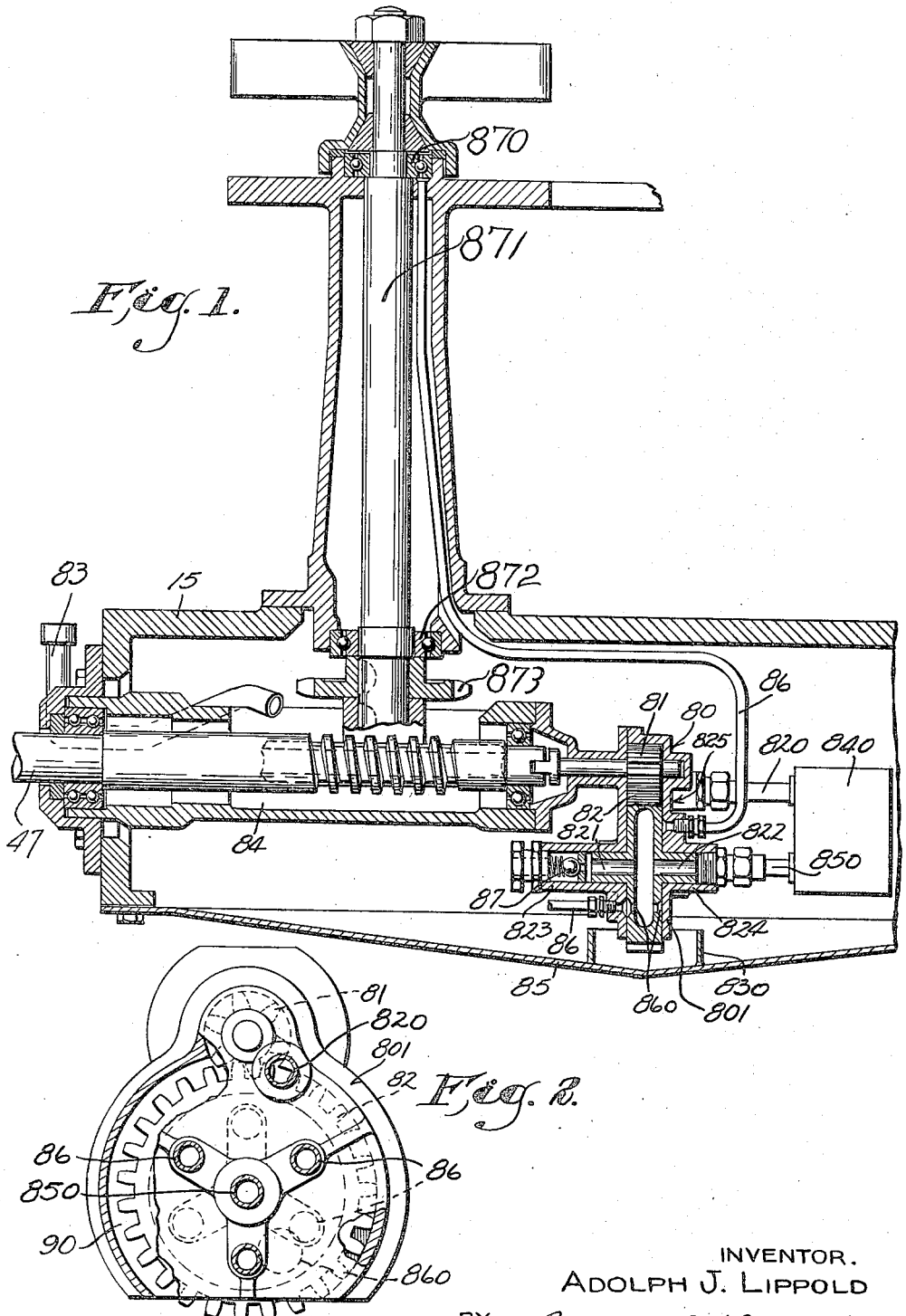
INVENTOR.
ADOLPH J. LIPPOLD
BY Norman E. H. Peletzke
ATTORNEY.

Patented Sept. 10, 1940

2,214,252

UNITED STATES PATENT OFFICE 2,214,252

LUBRICATING SYSTEM

Adolph J. Lippold, Milwaukee, Wis., assignor to Cherry-Burrell Corporation, Chicago, Ill., a corporation Original application July 11, 1936, Serial No. 90,099, which is a division of application Serial No. 7,742, February 23, 1935. Divided and this application August 17, 1939, Serial No. 290,580

6 Claims. (Cl. 184—6)

This invention relates to an improvement in a lubricating system and more particularly to an improvement in a system for application of lubricant to bearings under the full pressure of the lubricant circulating mechanism.

This application is a division of co-pending application Serial No. 90,099, filed July 11, 1936, now Patent No. 2,173,653, which in turn was a division of application Serial No. 7,742, filed February 23, 1935, which matured into United States Letters Patent No. 2,122,149.

The objects of this invention include the provision of a lubricant circulating pump in a lubricant circulating system in which each of the branches of the system is intermittently supplied with lubricating oil from the oil pump.

A further object of the invention pertains to the provision of a lubricating pump in a lubricating system having a plurality of lubricant conduits extending from the pump to a series of bearings to which the lubricant is forced under full pump pressure, and the return of the lubricant to the pump by gravitational flow over a series of bearings and gear trains, all of which are oiled in the course of the return of the liquid to the pump.

With the foregoing and other objects and important features in view, the invention consists of a novel arrangement as disclosed in the figures and description. These various characteristics will be more fully described and specifically pointed out in the appended claims, reference being made to the accompanying drawing in which:

Figure 1 is a vertical section through a portion of a machine in which the improved lubricating system is installed.

Figure 2 is an enlarged detail view in end elevation of the lubricating pump used for the pumping of liquid through the lubricating system.

Like parts are designated by the same reference numerals throughout the several views.

As shown in Figure 1, the improved lubricating system is installed in a portion of a bottle filling mechanism in which 15 is a portion of the main frame in which a main drive shaft 47 is extended upon suitable bearings. The gear pump 80 is driven directly from the main drive shaft 47 and comprises a driving pinion 81 and a driven gear 82 in a casing 801. The gear 82 is hollow and is provided with hollow hub portions 821 and 822 which extend into tubular lateral extensions 823 and 824 of the casing 825. The pump casing is open at its bottom and immersed in lubricant which is stored within a moat or wall 830 which prevents the foreign matter in the sump 85 from reaching the pump intake.

The sump 85 may be supplied with lubricant introduced through a filler pipe 83 which discharges into a box-like reservoir or casing 84 through which the main drive shaft 47 passes and in which is located a train of gears and other driving mechanism requiring lubrication. The surplus lubricant may overflow from the reservoir or casing 84 and fall into the sump 85 where the level of the lubricant is kept sufficiently high so that the grit-free upper strata thereof may pass over the margins of the normally submerged moat 830 and reach the pump intake. The pump intake is reduced to its simplest form by forming the casing 801 open at the bottom to expose the lower portions of the gear 82.

The entire lower portion of the closure or oil pan is below the level of the liquid in the sump 85 and the intake is in fact below the top margins of the moat 830. This eliminates any question of priming the pump and it will be apparent that any rotation of the pump gear 82 will carry lubricant between the gear teeth into the pump housing.

Due to the fact that the withdrawal of the teeth of pinion 81 from the interdental spaces of gear 82 immediately produces a vacuum at the point of withdrawal, the preferred embodiment of the pump illustrates a construction adapted to supply lubricant directly to this point through a passage having its entrance submerged in the sump. Such a passage can most conveniently be made at 90 within the gear housing on the suction side. The liquid pumped by the gear will flow upwardly through the passage 90 to the point where the withdrawal of the teeth of the pinion from those of the gear is producing a vacuum. However, various other constructions could be used such, for example, as the provision of an opening through the housing at the point of withdrawal of the teeth of pinion 81 from the interdental spaces of gear 82. Air could be permitted to enter through this port to break the vacuum or oil could also be supplied through this port by a conduit placed in association therewith and having its free end submerged in the oil in the sump or moat.

Such lubricant as enters the interdental spaces of the gear pump 80 is expelled from such spaces by displacement when the teeth of pinion 81 are immersed therein. The lubricant so displaced is forced through pipe 820 to a filter or oil purifier 840 and thence back through pipe 850 into the hollow interior of the pump 80.

The gear 82 also serves as a distributor for connecting the pressure pipe 850 consecutively with each of the various lines 86. These various lines 86 conduct the pump oil to the several bearings of the machine. In the drawing only one line has been shown directed to one set of bearings which is considered sufficient for the purpose of illustration. To enable such consecutive distribution of oil the hollow distributing gear 82 is provided in its opposite side faces with alined apertures 860.

The various conduits 86 communicate with the interior of the pump housing through ports therein, as shown in the drawing, in positions such that the openings 860 in the distributing gear 82 of the pump register successively with the various distributing pipes.

There is also a ball check relief valve 87 which opens axially from the hub of the distributing pump 80 to release to the sump any oil which produces an excessive pressure in the lines or in the interior of the distributing gear. If the lines or lubricant conduits were connected in parallel, in accordance with the usual practice, there may be an excess of flow of lubricant through those lines offering the least resistance to such flow. By handling the entire power of the pump consecutively to the various distributing leads, substantial uniformity of flow from all leads or conduits is assured and sufficient pressure is available to displace minor stoppages such as would become aggravated rather than displaced if the lines were connected in parallel from an accumulator.

As shown in Figure 1, lubricant is supplied by the pumping means through one of the conduits 86 to a bearing 870 from which the lubricant drains over a vertically extending shaft 871 through a second bearing 872 over gear mechanism within the casing 84 generally indicated by 873. From the gear mechanism generally indicated by 873 the lubricant continues its gravitational return to the oil sump by first draining into the oil casing 84 from which it in turn overflows and returns to the sump 85.

From the foregoing it will be apparent that, due to the improved arrangement of apparatus, an improved lubricating system is secured in which oil substantially free of sediment overflows from the settling sump into the moat from where it is picked up by a pump and consecutively distributed under the full pressure of the pump to the various lubricating conduits which supply the oil to elevated bearings from which bearings the oil in turn drains by gravity back toward the sump and, in its return passage, flows over various bearings and gear trains requiring oil before it again reaches the oil sump. Although only a certain specific embodiment of the invention has been shown and described various possible modifications thereof can be made. The invention, therefore, is not to be restricted except in so far as is necessary by the prior art and the spirit of the applied claims.

The invention is hereby claimed as follows:

1. In a lubricating system, the combination with a base provided with a sump, a driving shaft projecting into said base above said sump, a driven shaft extending upwardly from said base, gear mechanism connecting said shafts, a casing surrounding said driving shaft and said gear mechanism and providing a bath of lubricant in which said gear mechanism is immersed, a bearing for said driven shaft, and pump means connected with one of said shafts and having an inlet from said sump and a distributing line leading to said bearing, a moat in said sump about said inlet for said pump, the gravitational return flow from said bearing being guided to said casing and the overflow from said casing being guided to said sump.

2. A lubricating system comprising, in combination, a base provided with a sump, a casing arranged to overflow to said base, driving gearing disposed within said casing to be maintained immersed in lubricant stored therein and connected to driving and driven shafts, a pump operatively connected with a source of power for the operation of said pump, an intake for said pump connected with said sump, and a plurality of discharge conduits operatively associated with said pump for sequentially receiving the full pressure of said pump and with means for directing the gravitational flow of said discharge onto said driving gearing in said casing.

3. In a lubricating system, the combination with a base provided with a sump, of a moat in said sump, a casing within said base and arranged to overflow for the return of lubricant to said sump, a pump maintained on said casing and provided with an intake leading from said moat, a bearing requiring lubrication and having means gravitationally guiding a surplus of lubricant to said casing, an output pipe leading from said pump to said bearing, and gear mechanism within said casing to be immersed in the lubricant stored therein.

4. In a lubricating system, the combination with a sump having a moat therein, of a plurality of bearings arranged to overflow to said sump, a gear casing intermediate said bearings and said sump, lubricant lines leading to the respective bearings, pump mechanism arranged to draw lubricant from said moat within said sump for consecutive distribution to and through said lines under full pressure of the pump mechanism, and guide means over which the lubricant flows associated with said bearings for directing the gravitational return of the lubricant supplied by said lines to the casing and from the casing to the sump.

5. In a lubricating system for a bottle filler, a casing housing gearing means requiring oiling, a drive shaft supported within said casing, a driven shaft supported upon said casing and extending upwardly therefrom, bearings surrounding said driven shaft, an opening in the top of said casing adjacent the base of said driven shaft through which opening lubricant may be introduced and discharged to and from said casing, respectively, a lubricant sump below said casing into which lubricant may be discharged from said casing, a moat in said sump, a lubricant pump carried by said casing and having its intake extending into said moat, driving means intermediate said gearing means in said casing and said pump for driving said pump, and a series of conduits through which lubricant may be forced by said pump and directed against the bearings on said driven shaft, whereby the lubricant may pass by gravity downwardly over said upwardly extending driven shaft into said casing and from said casing into said sump.

6. In a lubricating system, the combination with a lubricant sump, of a plurality of bearings arranged to overflow into said sump, a gear casing intermediate said bearings and said sump, lubricant lines leading to said bearings, lubricant pump mechanism arranged to draw lubricant from said sump for sequential distribution to and through said lines under full pump pressure to said bearings, and guide means over which the lubricant flows associated with said bearings for directing the gravitational return of the lubricant supplied by said lines to the casing and from the casing to the sump.

ADOLPH J. LIPPOLD.